(12) United States Patent
Powell (10) Patent No.: US 6,271,298 B1
(45) Date of Patent: Aug. 7, 2001

(54) PROCESS FOR TREATING SMECTITE CLAYS TO FACILITATE EXFOLIATION

(75) Inventor: Clois E. Powell, Seguin, TX (US)

(73) Assignee: Southern Clay Products, Inc., Gonzales, TX (US)

(*) Notice: Subject to any disclaimer, the term of this patent is extended or adjusted under 35 U.S.C. 154(b) by 0 days.

(21) Appl. No.: 09/559,686

(22) Filed: Apr. 27, 2000

Related U.S. Application Data (60) Provisional application No. 60/131,415, filed on Apr. 28, 1999.

(51) Int. Cl.[7] .................................................... C08K 3/34
(52) U.S. Cl. ........................ 524/445; 523/333; 523/343
(58) Field of Search ............................... 523/333, 343; 524/445

(56) References Cited

U.S. PATENT DOCUMENTS

| | | | |
|---|---|---|---|
| 4,739,007 | * | 4/1988 | Okada et al. ........................ 524/789 |
| 4,810,734 | * | 3/1989 | Kawasumi et al. .................. 523/216 |
| 4,889,885 | * | 12/1989 | Usuki et al. ........................ 524/445 |
| 5,164,440 | * | 11/1992 | Deguchi et al. .................... 524/444 |
| 5,385,776 | * | 1/1995 | Maxfield et al. ................... 428/297 |
| 5,554,670 | * | 9/1996 | Giannelis et al. .................. 523/209 |
| 5,663,111 | * | 9/1997 | Gadberry et al. ................... 501/106 |
| 5,728,764 | * | 3/1998 | Bauer et al. ........................ 524/451 |
| 5,780,376 | * | 7/1998 | Gonzales et al. ................... 501/146 |

\* cited by examiner

*Primary Examiner*—Kriellion Sanders
(74) *Attorney, Agent, or Firm*—Conley, Rose & Tayon, PC; Eric B. Meyertons (57) ABSTRACT

In the method for preparing a nanocomposite by intercalating a smectite clay with a quaternary ammonium ion, and exfoliating the intercalated clay into a polymer matrix; an improvement is disclosed which augments exfoliation. The smectite clay is edge treated with negatively charged organic molecules prior to the exfoliation. For these purposes a high charge density anionic polymer such as a polyacrylate may be used.

9 Claims, 8 Drawing Sheets

PROCESS FOR TREATING SMECTITE CLAYS TO FACILITATE EXFOLIATION

This application claims benefit to U.S. Provisional application Ser. No. 60/131,415 filed Apr. 28, 1999.

FIELD OF THE INVENTION

This invention relates generally to smectite clays, and more specifically relates to a process for treating such clays in order to facilitate exfoliation, a phenomenon which is particularly significant in the preparation of clay-polymer nanocomposites.

BACKGROUND OF THE INVENTION

As utilized in the present specification, the term "smectite" or "smectite-type clays" refers to the general class of clay minerals with expanding crystal lattices, with the exception of vermiculite. This includes the dioctahedral smectites which consist of montmorillonite, beidellite, and nontronite, and to the trioctahedral smectites, which includes saponite, hectorite, and sauconite. Also encompassed are smectite-clays prepared synthetically, e.g. by bydrothermal processes as disclosed in U.S. Pat. Nos. 3,252,757; 3,586,468; 3,666,407; 3,671,190; 3,844,978; 3,844,979; 3,852,405; and 3,855,147.

For a number of years interest has been developing in processes which are useful in producing composite materials composed of an organic polymer and a smectite-type clay mineral, with the mineral being connected to the polymer through ionic or other bonding. For example, in Japan Laid Open Application S51(76)-109998 (owned by Unichika, K.K.) and entitled "Method for Manufacturing a Clay-Polyamide Composite", a method is disclosed for manufacturing a clay-polyamide composite characterized by carrying out the polymerization of lactam in the presence of a clay-organic compound composite made by carrying out ion exchange to bond an organic compound which contains at least one amino group and has the catalyst effect of polymerizing the lactam and clay. The organic compounds mentioned include omega-aminocapronic acid, a nylon salt, hexamethylenediamine, and aminodecanoic acid. The lactams include epsilon-caprolactam and others such as omega-enantolactam, omega-capryllactam, and omega-laurolactam. The clays used include the montmorillonite group of clay minerals such as montmorillonite, hectorite, etc; and other clays are listed. Montmorillonite is preferred because of the high exchange capacity. The composite is made by first ion exchanging the clay with the organic compound under aqueous conditions, after which the which the suspension is washed, filtered and dried, then crushed. (This is essentially the conventional procedure for preparing a conventional organophilic clay, i.e. an "organoclay".) The "organoclay" and lactam are mixed, with the organoclay being 10 to 75 wt % of the mixture. During mixing the mixture is brought to 80–100 deg C. to melt the lactam. Polymerization is carried out at 240 to 260 deg C. In the resulting composite product it is stated that the silicate layer has a thickness of 9.6 Angstroms. In a first example the interlayer distance of the organoclay layers before polymerization was 3.4 Angstroms, and 13.1 Angstroms after polymerization. In Example 4 the interlayer distance was 6.5 Angstroms before polymerization, and 50.6 Angstroms after polymerization. The composite produced in this publication is stated to have good fire-retardant properties, and improved mechanical properties. Related disclosures are found in U.S. Pat. Nos. 4,739,007; 4,810,734; and 4,889,885.

The phase dispersions exhibited by the composite materials thus far discussed are relatively coarse, and differ materially in this respect from nanocomposites. The latter are a relatively new class of materials which exhibit ultrafine phase dimensions, typically in the range 1–100 nm. Experimental work on these materials has generally shown that virtually all types and classes of nanocomposites lead to new and improved properties when compared to their micro- and macrocomposite counterparts. The number of nanocomposites based on smectite-type clays and linear thermoplastics is growing. Wang and Pinnavaia, e.g., have recently reported delamination of an organically modified smectite in an epoxy resin by heating an onium ion exchanged form of montmorillonite with epoxy resin to temperatures of 200–300° C. Chemistry of Materials, vol. 6, pages 468–474 (April, 1994). A further example appears in U.S. Pat. No. 5,554,670, where an epoxy-silicate nanocomposite is disclosed which is prepared by dispersing an organically modified smectite-type clay in an epoxy resin together with diglycidyl ether of bisphenol-A (DGEBA), and curing in the presence of either nadic methyl anhydride (NMA), and/or benzyldimethyl amine (BDMA), and/or boron trifluoride monoethylamine (BTFA) at 100–200° C. Molecular dispersion of the layered silicate within the crosslinked epoxy matrix is obtained, with smectite layer spacings of 100Å or more and good wetting of the silicate surface by the epoxy matrix. Additional recent references evidencing the increasing interest in nanocomposites incorporating organoclays in polymer matrices include U.S. Pat. Nos. 5,164,440; 5,385,776; 5,552,469; and 5,578,672.

In a typical procedure for preparing a nanocomposite, the smectite clay, most commonly a montmorillonite, is treated with an organic ammonium ion to intercalate the organic molecule between the silicate layers of the clay, thereby substantially swelling or expanding the interlayer spacing of the smectite. Thereafter the expanded silicate layers are separated or exfoliated in the presence of or with the assistance of a polymer with which reactive groups on the intercalated organic molecule are compatible. A monomer can also be used which is polymerized after being intermixed with the intercalated clay. High shear mixing may be used as part of the exfoliation process.

SUMMARY OF THE INVENTION

Now in accordance with the present invention, it has unexpectedly been discovered that edge treatment of smectite clays, such as montmorillonite, with negatively charged organic molecules, increases the exfoliation efficiency achieved in preparing nanocomposites. While it has heretofore been known to subject smectite clays to surface treatment incident to preparing a nanocomposite; and while it is also known to edge treat a smectite clay with negatively charged polyanions where the treated clay is subsequently used as a reinforcing filler in rubber and the like (see U.S. Pat. No. 2,883,356); it has not to my knowledge been known to utilize such edge treatment to augment exfoliation of smectites in the preparation of nanocomposites.

DETAILED DESCRIPTION OF THE INVENTION

Preferably, the smectite clay in the present invention is a natural or synthetic clay mineral selected from the group consisting of hectorite, montmorillonite, bentonite, beidelite, saponite, stevensite and mixtures thereof. A particularly preferred choice for the smectite is montmorillonite. The clay edges are treated with an anionic polymer, such as a polyacrylate. A moderately high charge polymer is used, which becomes strongly attached to the clay edges, making them strongly anionic. It is well known in the art of preparing organophilic clays that under appropriate conditions an organic compound which contains a cation will react by ion exchange with clays which contain a negative layer lattice and exchangeable cations to form the organoclay products. In the present invention when an alkyl quaternary ammonium cation is subsequently added, the quaternary cation will complex not only with the clay basal surfaces, but also with the edges. This results in a clay particle with a relatively uniform, hydrophobic coating. This leads to improved dispersibility in the plastic matrix of the nanocomposite, and the resulting improved properties of the latter. Since polyacrylates can be easily converted to polyacrylamides with a wide variety of alkyl groups attached to the nitrogen, such polymers can be readily modified to optimize the dispersion of the smectites in plastics.

In a preferable procedure for practicing the invention, the smectite mineral is crushed, ground, slurried in water and screened to remove grit and other impurities. The component mineral can then be subjected as a dilute (1 to 6% solids) aqueous slurry to high shearing in a suitable mill. Most preferred for use in this shearing step is a homogenizing mill of the type wherein high speed fluid shear of the slurry is effected by passing the slurry at high velocities through a narrow gap, across which a high pressure differential is maintained. This type of action can e.g. be effected in the well-known Manton-Gaulin "MG") mill, which device is sometimes referred to as the "Gaulin homogenizer". Reference may be made to commonly assigned U.S. Pat. Nos. 4,664,842 and 5,110,501 for further details of such mill. The conditions for use of the MG mill may in the present instance be substantially as in the said patents; e.g. the said pressure differential across the gap is preferably in the range of from 70,300 to 562,400 g/cm² with 140,600 to 351,550 g/cm² being more typical in representative operations. Depending upon the specifics of the equipment, pressures higher than 562,400 g/cm² can readily be used. The slurry to be treated may be passed one or more times through the MG mill. Among additional instrumentalities which can be effectively utilized in the present invention to provide high shearing of the clay components, is the rotor and stator arrangement described in commonly assigned U.S. Pat. No. 5,160,454.

The polyacrylate which is used to coat the clay edges is applied to the mineral prior to the high shearing step. The polyacrylate is added at a dosage rate of about 0.1 to 1.0% by weight of the dry clay, with 0.5% by weight being typical. Following the shearing the excess charge on the edges as well as the clay surface charge may be reacted with the quaternary. Among typical polyacrylates which may be used are the Alcogum SL-76 or SL-78 products of Alco Chemical Division of National Starch and Chemical Company, the JARCO M-25B product of Jarco Chemical Co., and various polyacrylate products of Allied Colloids.

When used in composites such as nanocomposites, the organoclay compositions of the invention yield unexpected improvements in the mechanical and other properties of the composite, including with respect to tensile strength, tensile modulus and flex modulus, all of which are highly significant attributes for the plastics and similar formulators.

The treated clays of the invention can be used in preparing nanocomposites by any of the methods which are set forth in the prior referenced patents, and with a large variety of polymerizable resins such as polyamide, epoxy, polyvinyl, polyacrylamide, etc.

The invention will now be illustrated by examples, which are to be regarded as illustrative and not delimitative of the invention. Unless indicated to the contrary, all parts and percentages are by weight.

EXAMPLES 1 to 8

Eight nanocomposite samples A through H were prepared in which a mineral clay was dispersed in a nylon 6,6 resin matrix. The resin used was the VXP-12 product of Solutia Inc. In preparing the samples, purified slurries of the montmorillonite clay were either mixed or not mixed with a polyacrylate of the type described above, and the samples were then subjected to high shear by being passed as dilute aqueous slurries through an MG mill. With two exceptions the sheared samples were then treated with an alkyl quaternary ammonium compound. The quaternary compound used for these latter samples was a branched chain quaternary ammonium compound of the type disclosed in U.S. Pat. No. 5,739,087, more specifically being a dimethyl hydrogenated tallow -2-ethyl hexyl ammonium methylsulfate. The treated slurries were then dewatered, and the resulting clay cake was dried and ground. In each instance the resulting powder was mixed with pellets of the polymer, melted and blended in an O-M twin screw mixer-extruder, and the extruded samples were permitted to solidify. The final resulting samples were then subjected to wide angle X-ray microscopy (WAX).

The treatment patterns for the eight samples is set forth in Table I below:

TABLE I

| Clay Sample | % Clay by wt. | Edge Treatment with Polyacrylate | Surface Treatment with Quat |
| --- | --- | --- | --- |
| A | 7.3 | No | Yes |
| B | 4.3 | No | Yes |
| C | 6.4 | Yes | No |
| D | 4.7 | Yes | No |
| E | 5.4 | No | Yes |
| F | 3.4 | Yes | Yes |
| G | 4.6 | No | Yes |
| H | 4.6 | Yes | Yes |

Figure 1:
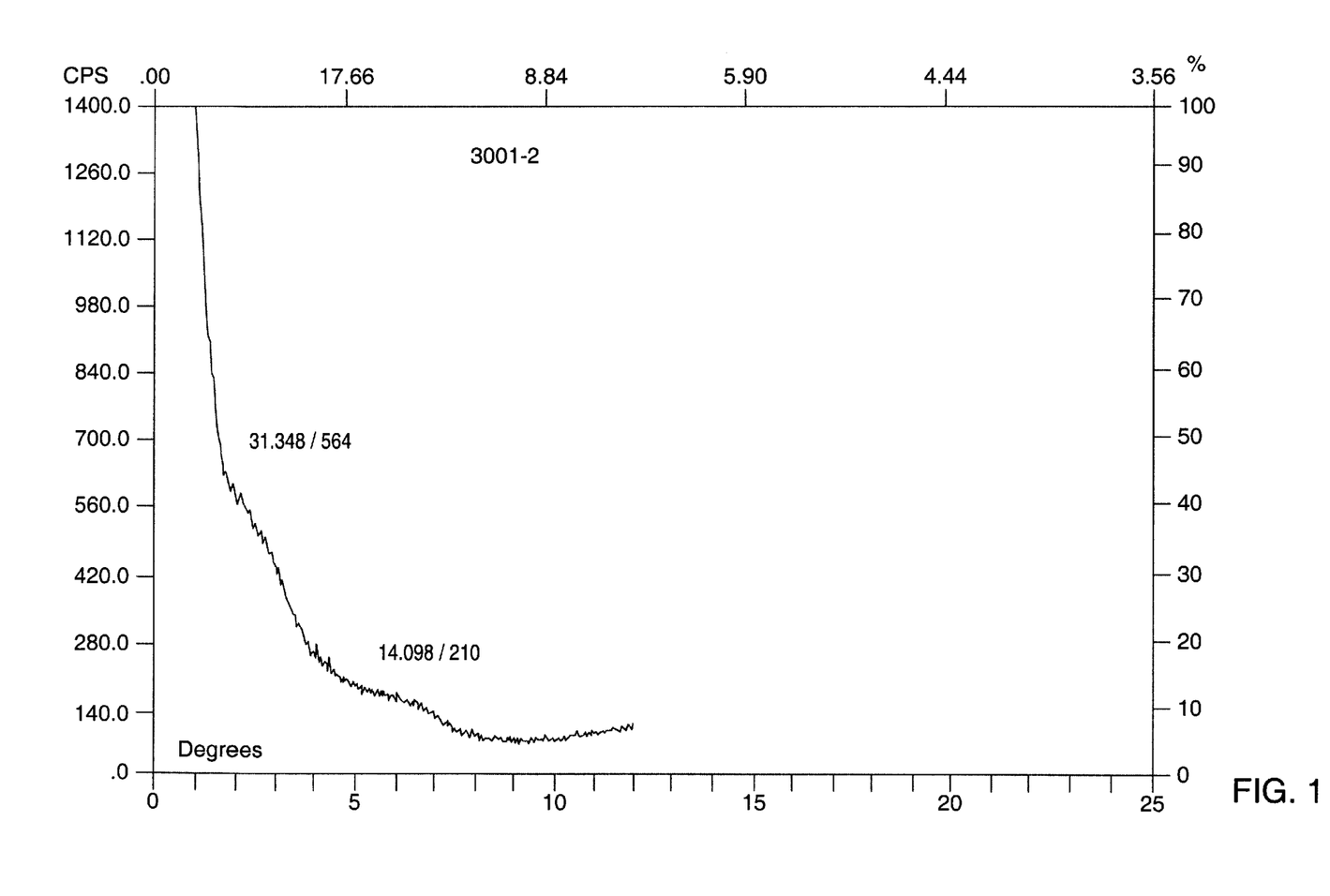
FIGS. 1 through 8 are wide angle X-ray scan patterns for clay-polymer control samples and for clay-polymer samples prepared in accordance with the invention.
Figure 2:
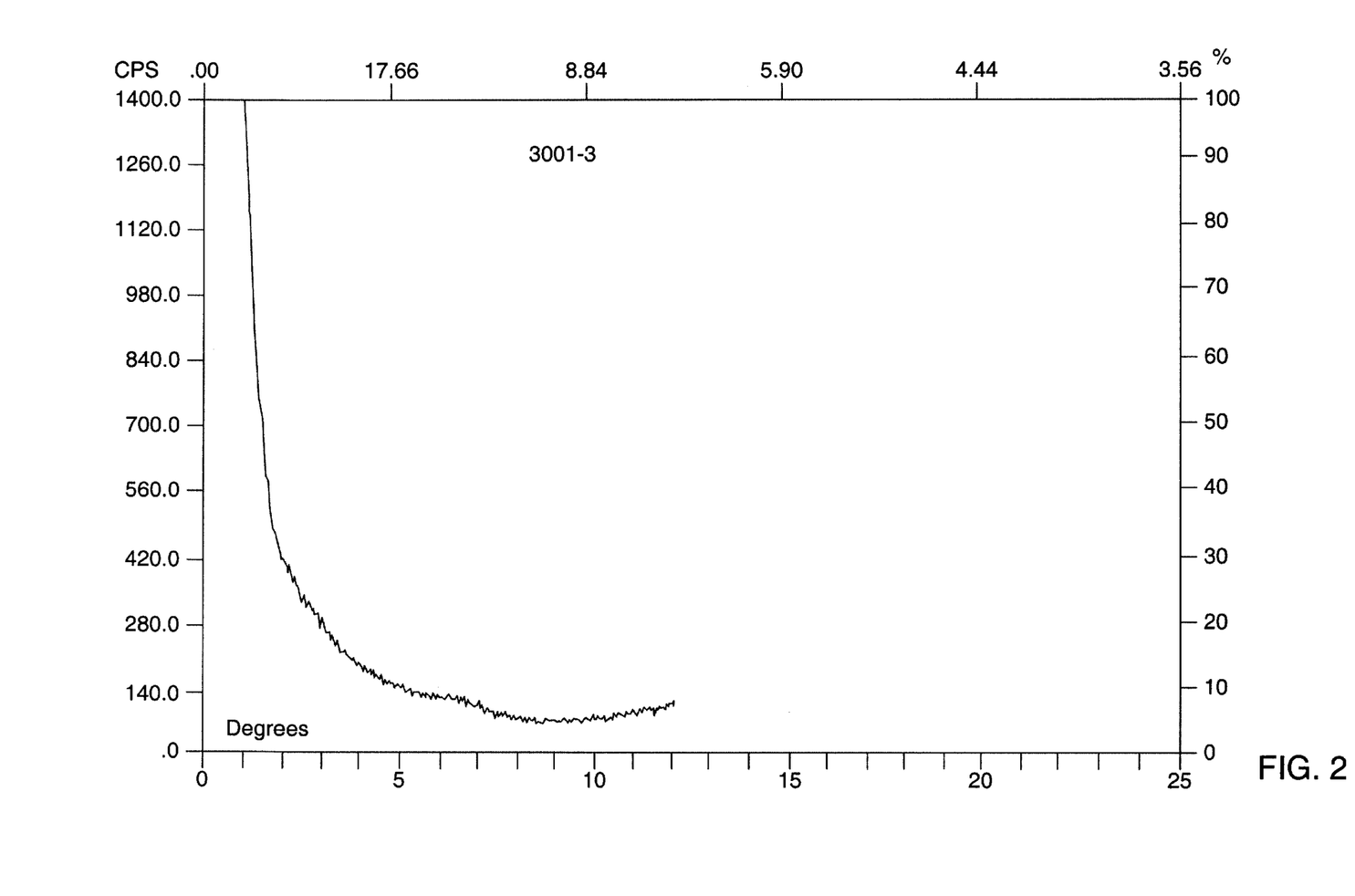

The patterns obtained for samples A and B appear in FIGS. 1 and 2. Both samples A and B have been surface treated but not edge treated. In sample A the clay is resent as 7.3% by weight; in sample B the clay is 4.2% by weight. There are clear first and second order reflection peaks in FIG. 1 indicating incomplete exfoliation. The peaks are much less pronounced in FIG. 2. The exfoliation of the clay particles is actually quite good in FIG. 2, with the sample B showing a clay platelet separation of at least 70 Å.

Figure 3:
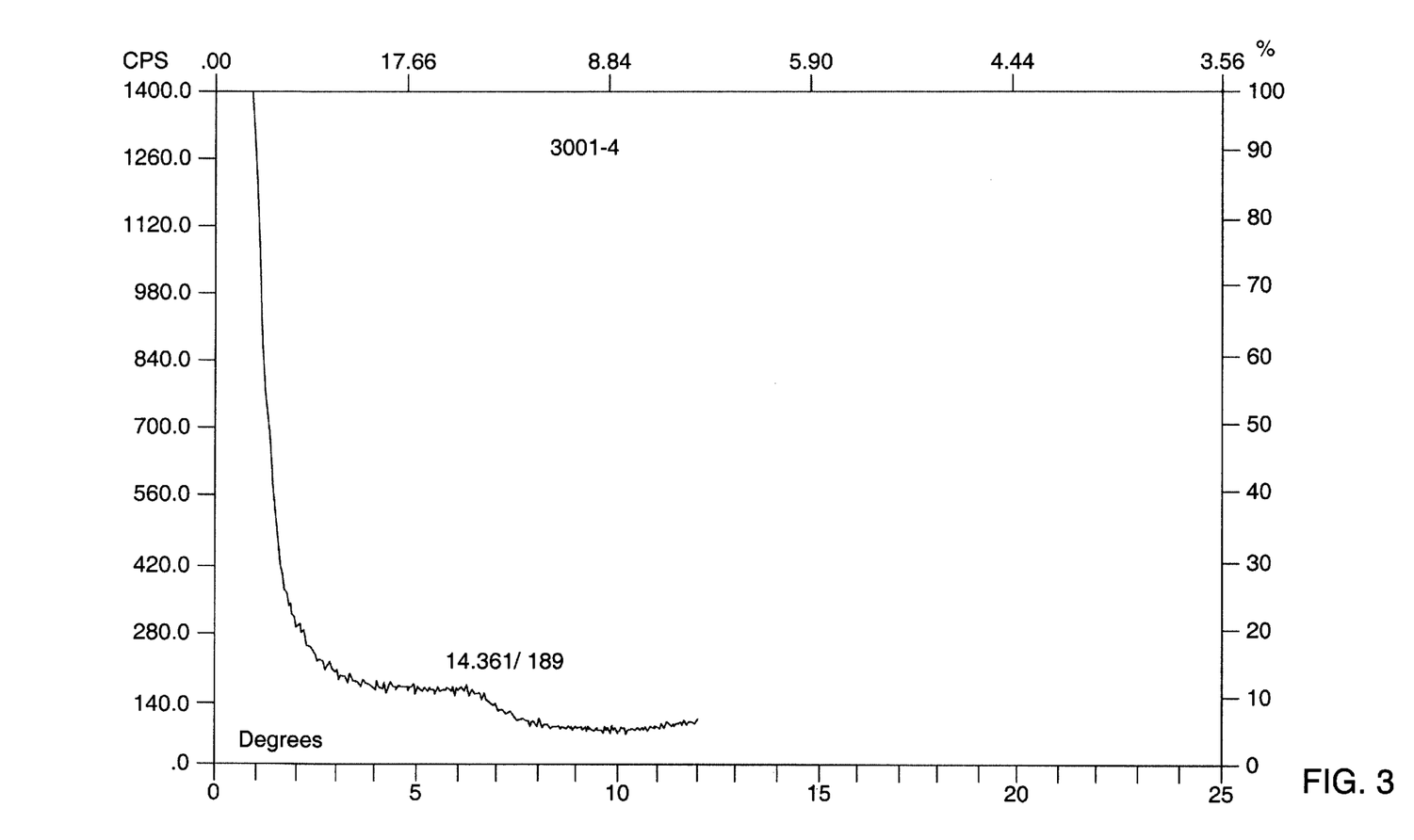
Figure 4:
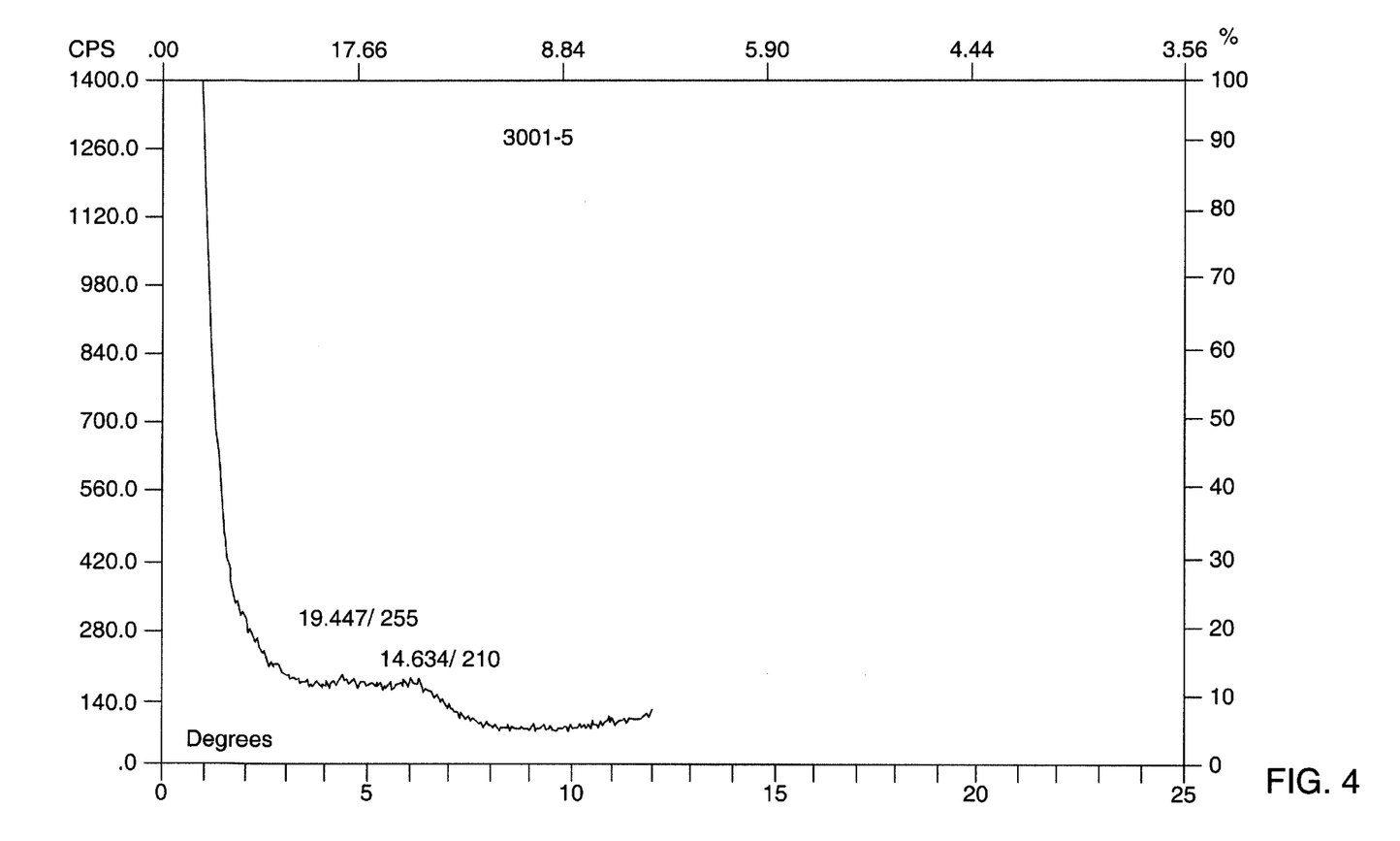

The patterns obtained for samples C and D appear in FIGS. 3 and 4. These samples have been edge treated but not surface treated. In sample C the clay is present as 6.4% by weight; in sample D the clay is 4.7% by weight. There are evident reflection peaks in both FIGS. 3 and 4. While it will be clear that there is less exfoliation of the clay particles in both samples C and D than in samples A and B, there is still a rather surprising degree of exfoliation.

Figure 5:
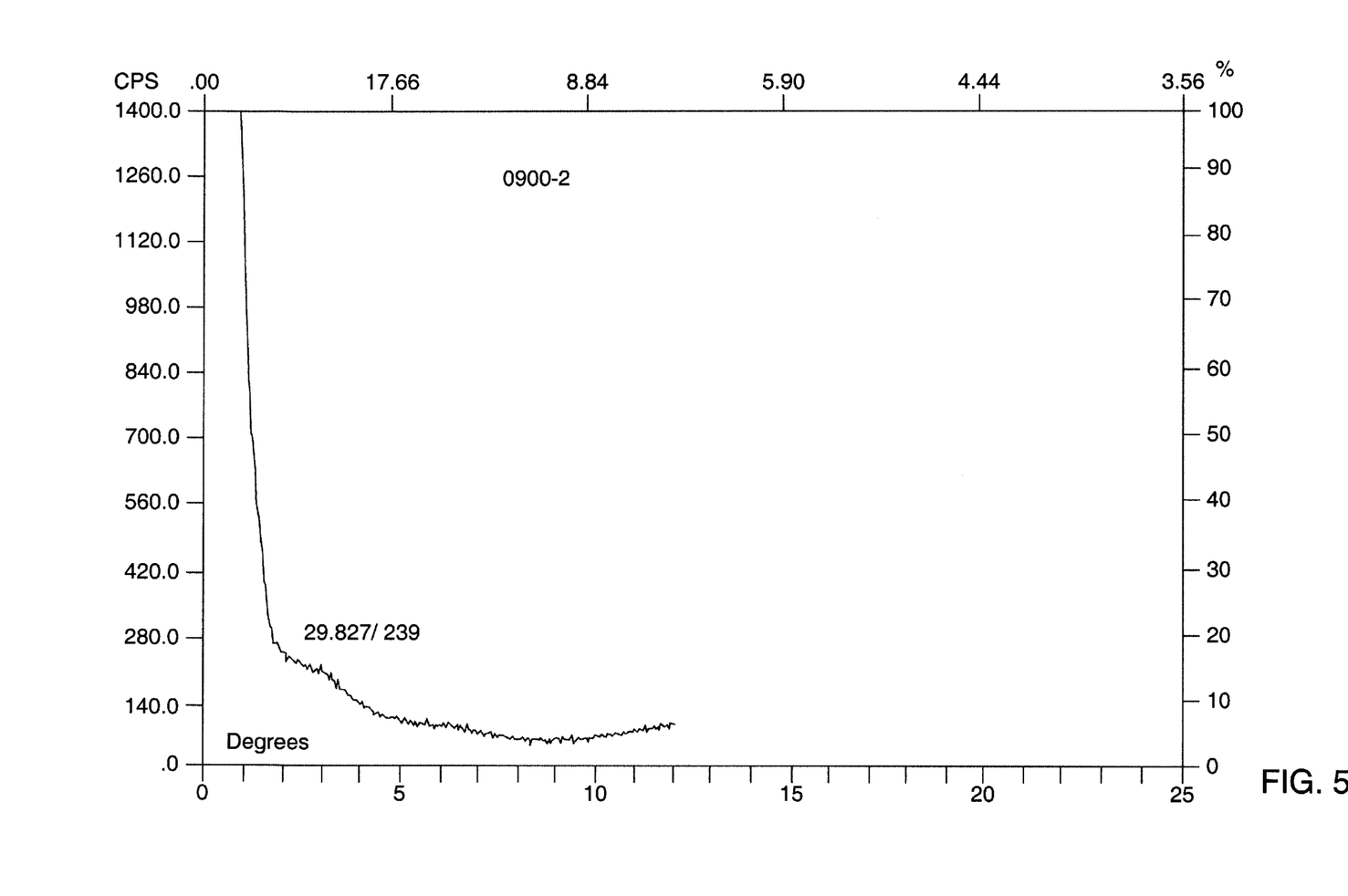
Figure 6:
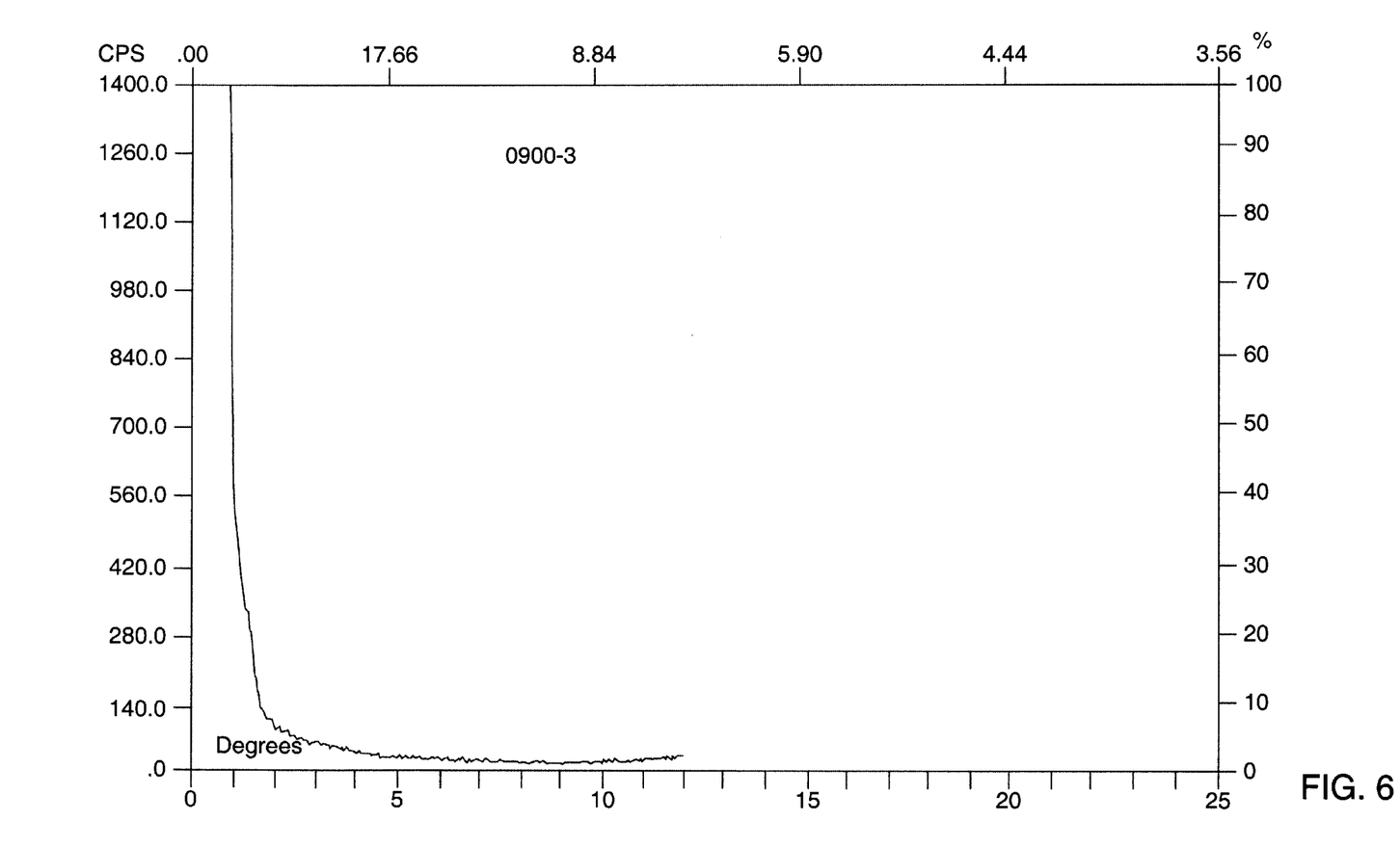

The patterns obtained for samples E and F appear in FIGS. 5 and 6. The clay in sample E has been surface treated but not edge treated. Sample F has been edge treated with polyacrylate, and surface treated with the quat. In sample E the clay is present as 5.4% by weight; in sample F the clay is 3.4% by weight. It will be evident that much improved exfoliation is present with sample F.

Figure 7:
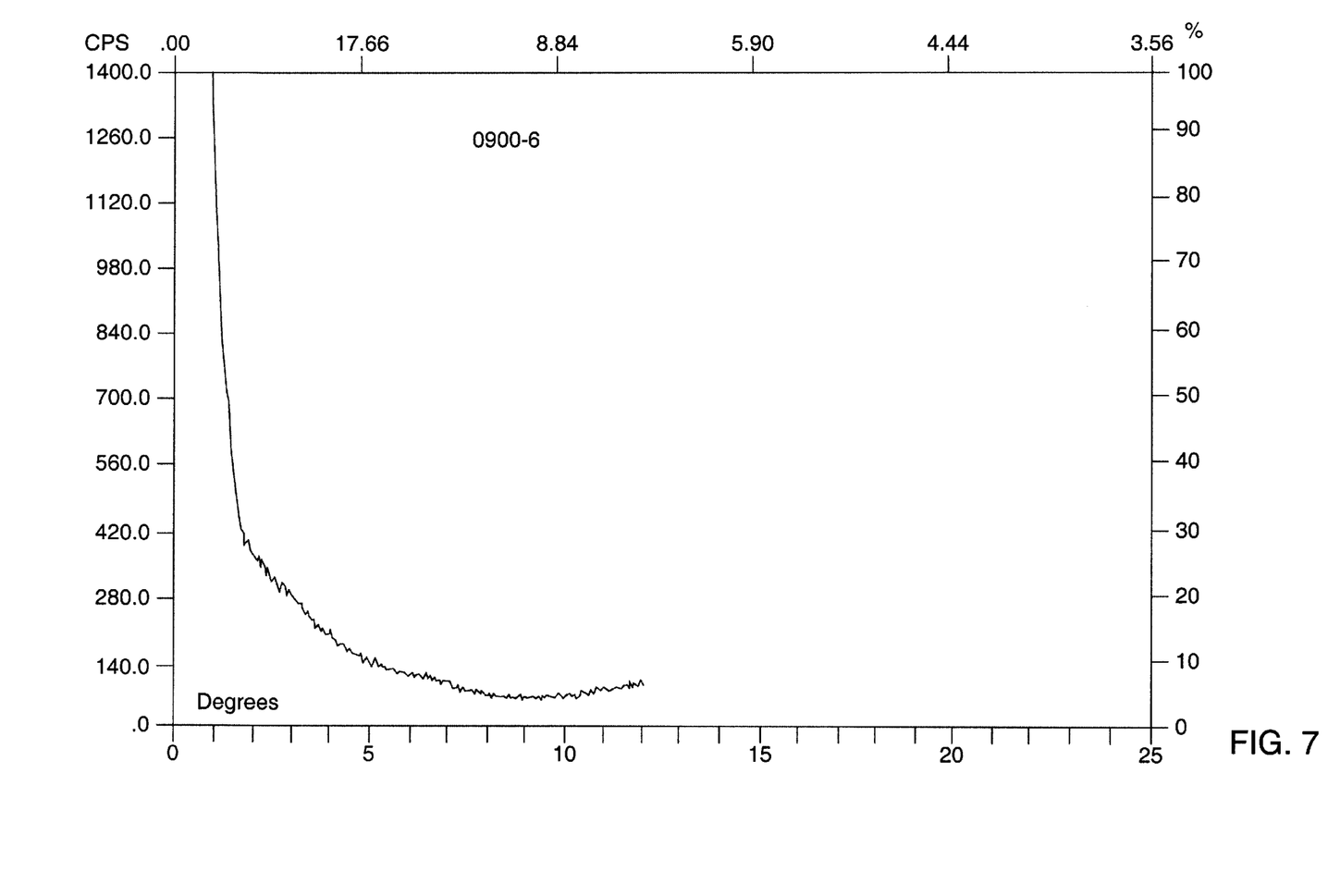
Figure 8:
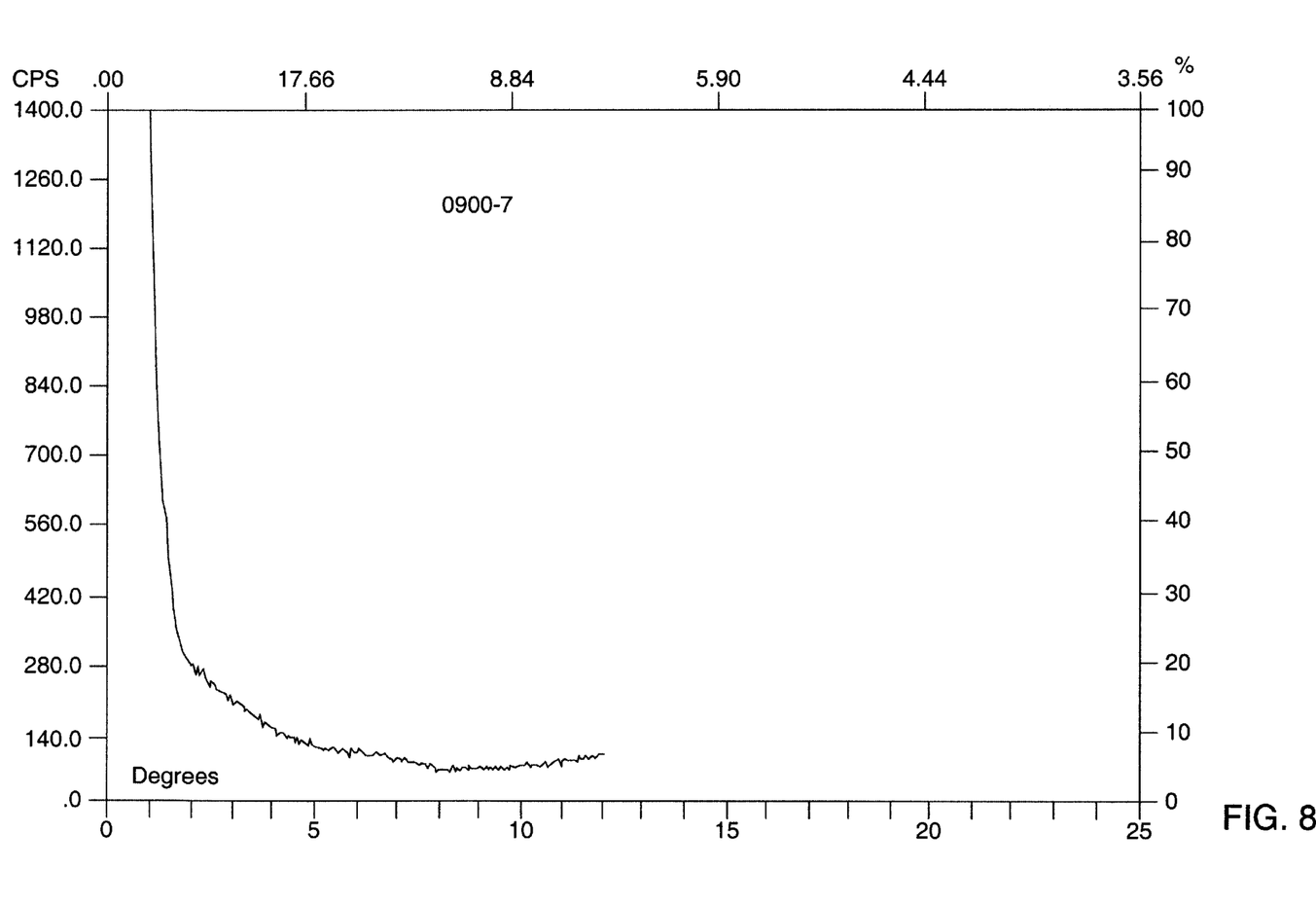

The patterns obtained for samples G and H appear in FIGS. 7 and 8. Sample G like sample E, has been surface treated, but has not been edge treated by the polyacrylate. Sample H, like sample F has been both surface treated and edge treated. In sample G the clay is present as 5.8% by weight; in sample H the clay is 4.6% by weight Excellent exfoliation is again present with sample H.

While the present invention has been described in terms of specific embodiments thereof, it will be understood in view of the present disclosure, that numerous variations upon the invention are now enabled to those skilled in the art, which variations yet reside within the scope of the present teaching. Accordingly, the invention is to be broadly construed, and limited only by the scope and spirit of the claims now appended hereto.

I claim:

1. In the method for preparing a nanocomposite by the steps of intercalating a smectite clay with a quaternary ammonium ion, and exfoliating the intercalated clay into a polymer matrix; the improvement enabling augmented exfoliation, comprising: edge treating the smectite clay with negatively charged organic molecules prior to said exfoliation.

2. A method in accordance with claim 1, wherein said molecules comprise a high charge density anionic polymer.

3. A method in accordance with claim 2, wherein said polymer is a polyacrylate.

4. A method in accordance with claim 3, wherein said polyacrylate is added to said clay at 0.1 to 1.0% by weight of the dry clay.

5. A method in accordance with claim 4, wherein said smectite clay is a montmorillonite, which is intercalated with said quaternary ammonium ion by being treated as an aqueous slurry with said ion.

6. A method in accordance with claim 5, wherein said edge treating is carried out prior to treatment of the clay with said quaternary ammonium ion, whereby the quaternary ammonium ion complexes with both the clay edges and the clay basal surfaces.

7. A method in accordance with claim 6, wherein said aqueous slurry of montmorillonite is treated with said polyacrylate and then subjected to high shear, prior to being treated with said quaternary ammonium ion.

8. A method in accordance with claim 7, wherein said high shear step is carried out by passing the aqueous slurry of montmorillonite through a Manton-Caulin mill.

9. A method in accordance with claim 6, wherein the source of said intercalating ion is a branched chain quaternary ammonium compound.

* * * * *

UNITED STATES PATENT AND TRADEMARK OFFICE
CERTIFICATE OF CORRECTION

PATENT NO.    : 6,271,298 B1
DATED         : August 7, 2001
INVENTOR(S)   : Clois E. Powell

It is certified that error appears in the above-identified patent and that said Letters Patent is hereby corrected as shown below:

<u>Column 6,</u>
Line 22, "Manton-Caulin" should read -- Manton-Gaulin --.

Signed and Sealed this

Sixteenth Day of July, 2002

Attest:

Attesting Officer

JAMES E. ROGAN
Director of the United States Patent and Trademark Office

UNITED STATES PATENT AND TRADEMARK OFFICE
CERTIFICATE OF CORRECTION

PATENT NO. : 6,271,298 B1  Page 1 of 1
DATED : August 7, 2001
INVENTOR(S) : Clois E. Powell It is certified that error appears in the above-identified patent and that said Letters Patent is hereby corrected as shown below:

Column 1,
Line 22, please delete "bydrothermal" and substitute -- hydrothermal --.

Signed and Sealed this

Fifteenth Day of April, 2003

JAMES E. ROGAN
*Director of the United States Patent and Trademark Office*